J. E. WALTER.
VACUUM LEECH.
APPLICATION FILED NOV. 24, 1908.

931,102. Patented Aug. 17, 1909.

Witnesses
Jas. E. Dodge.
S. E. Dodge.

Inventor
J. E. Walter,
By Beeler & Robb
Attorneys

UNITED STATES PATENT OFFICE.

JOHN E. WALTER, OF MOUNTAIN HOME, IDAHO.

VACUUM-LEECH.

No. 931,102.　　　Specification of Letters Patent.　　　Patented Aug. 17, 1909.

Application filed November 24, 1908. Serial No. 464,344.

*To all whom it may concern:*

Be it known that I, JOHN E. WALTER, a citizen of the United States, residing at Mountain Home, in the county of Elmore and State of Idaho, have invented a new and useful Vacuum-Leech, of which the following is a specification.

This invention relates to that class of appliances or devices for use principally in surgical operations, and the same is adapted for different specific uses with a very slight alteration in structure, the main portion thereof remaining unchanged.

The invention comprises certain specific features of construction hereinafter fully described and claimed and illustrated in the accompanying drawings, in which—

Figure 1:
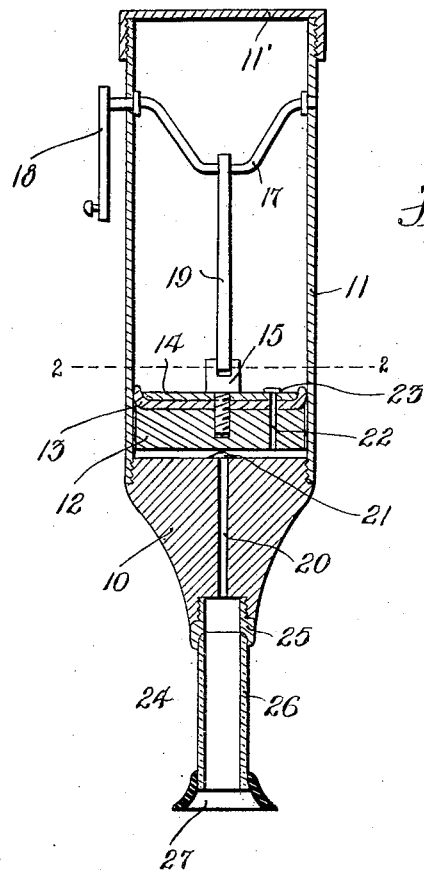
Figure 4:
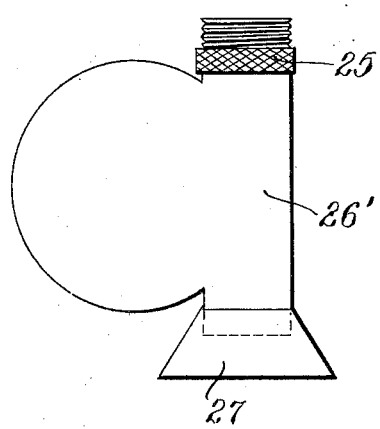
Figure 3:
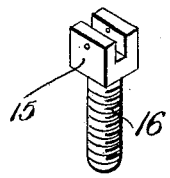
Figure 2:
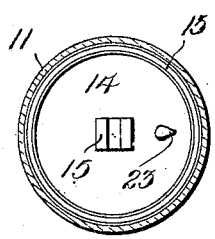

Figure 1 is a vertical section of the device, showing in connection therewith one form of mouth piece or nozzle; Fig. 2 is a cross sectional view on the line 2—2 of Fig. 1, showing certain parts in plan. Fig. 3 is a detail of a connecting means, and Fig. 4 shows a modified form of mouth piece or nozzle on an enlarged scale.

Throughout the following detail description and on the several figures of the drawings similar parts are referred to by like reference characters.

This invention, as before indicated, is adapted for various uses, such for instance as the withdrawal of comedones, for use as a breast pump, and for various uses to which an artificial leech may be applied. As herein set forth the improvement includes a base or main portion 10, which for convenience may be frusto-conical in form, and secured to its upper or base portion, as by screw-threads, is a cylinder 11. Within the cylinder 11 operates a piston 12, provided with a leather packing gasket 13. Said gasket is held in place by a metallic disk 14, of slightly less diameter than the diameter of the piston. A cross head 15 having a screw 16 is so disposed with relation to the piston as to clamp the aforesaid disk and gasket in place on the upper surface of the piston, the screw passing through said parts and entering the body of the piston.

Journaled for operation transversely of the cylinder 11 and proximate to the upper end thereof is a crank shaft 17, to which is connected an operating crank 18. A connecting rod 19 is pivoted to the cross head 15 and is journaled on the aforesaid crank shaft.

A port 20 extends centrally through the base 10 and is guarded at its upper end by a one-way valve 21. The piston 12, also, is provided with a vertical port 22, and a valve 23, similar to the valve 21, guards its upper end.

A nozzle or mouth piece 24, including a union 25, is connected to the smaller end of the base 10, as by screw threads. The main body 26 of the nozzle is preferably of transparent material, whereby the operator may observe the progress of the operation being performed, and at its lower end it is fitted with a rubber washer or flange 27, whereby it may be caused to tightly embrace the flesh operated upon. The nozzles may be made of various forms and sizes, depending upon the character of work to be performed. In Fig. 4 is illustrated a nozzle, the body 26′ of which is provided with an enlarged reservoir, as may be desirable in some instances.

In operation the device will be held by the operator in one hand applied to the part to be operated upon, and by the other hand the operator will turn the crank 18 with the result that the piston will be caused to reciprocate up and down once for each rotation of the crank shaft. On the up stroke of the piston the air contained in the nozzle and port 20 will be caused to pass the valve 21, and on the down-stroke of the piston the valve 21 will close causing the air beneath the piston to pass through the port 22, in a manner well understood. The gasket 13 will cause the piston to fit the cylinder closely on its up stroke when suction is required, but will permit the piston to move downwardly freely. The cylinder 11 may be closed if desired by a cap 11′.
Having thus described the invention, what is claimed as new, is:

The hereindescribed vacuum leech comprising, in combination, a base having a longitudinal port therethrough, a valve guarding the upper end of said port, a cylinder connected to the upper portion of the base, a piston slidably fitted within said cylinder, said piston comprising a flexible gasket and a rigid disk adjacent thereto, and having a vertical port therethrough, a valve guarding the upper end of the latter port, a cross head connected to the piston and securing the said disk and gasket in place, a crank shaft journaled in the cylinder, a connecting rod connecting the crank shaft and cross head, means to rotate the crank shaft, and a detachable nozzle connected to the lower end of the base member, substantially as set forth.

In testimony whereof I affix my signature in the presence of two witnesses this 7th day of November, 1908.

JOHN E. WALTER.

Witnesses:
J. M. OWEN,
RUBY MELLEN.